United States Patent [19]

Giovannetti

[11] Patent Number: 4,693,630

[45] Date of Patent: Sep. 15, 1987

[54] FASTENING DEVICE FOR RELEASABLE INTERCONNECTION OF PANELS

[75] Inventor: Fiorello Giovannetti, Segrate, Italy

[73] Assignees: Laura Giovannetti; Antonio Giovannetti, both of Segrate, Italy; a part interest to each

[21] Appl. No.: 661,439

[22] Filed: Oct. 16, 1984

[30] Foreign Application Priority Data

Oct. 18, 1983 [IT] Italy ................ 23348 A/83

[51] Int. Cl.$^4$ .............................................. F16B 12/02
[52] U.S. Cl. ............................ 403/405.1; 403/408.1; 52/127.9
[58] Field of Search ............... 403/405.1, 406.1, 407.1, 403/408.1, 409.1, 231, 9; 52/321, 584, 127.9

[56] References Cited

U.S. PATENT DOCUMENTS

| | | | |
|---|---|---|---|
| 3,028,184 | 4/1962 | Knowlton | 403/406.1 |
| 4,020,613 | 5/1977 | Reynolds et al. | 403/321 |
| 4,507,010 | 3/1985 | Fujiya | 403/322 |

FOREIGN PATENT DOCUMENTS

| | | |
|---|---|---|
| 0070362 | 1/1983 | European Pat. Off. . |
| 2546526 | 4/1977 | Fed. Rep. of Germany . |
| 2546751 | 4/1977 | Fed. Rep. of Germany . |
| 2610200 | 9/1977 | Fed. Rep. of Germany . |
| 2623814 | 12/1977 | Fed. Rep. of Germany . |
| 2748272 | 5/1979 | Fed. Rep. of Germany . |
| 2152941 | 4/1973 | France . |
| 2047376 | 11/1980 | United Kingdom ............ 403/406.1 |

Primary Examiner—Cornelius J. Husar
Assistant Examiner—Joseph A. Fischetti
Attorney, Agent, or Firm—Fleit, Jacobson, Cohn & Price

[57] ABSTRACT

A fastening device including a housing element, a body rotatable for at least an arc in the housing element, and a resilient element located between the housing element and the body. The resilient element has arms movable between a disengagement position, at which the arms are near one another and extended, and an engagement position, at which the arms are moved away from one another and retracted for a traction engagement with the walls of an engagement hole. The body has cam parts for forcing the arms from the disengagement position to the engagement position, when the body is rotated.

13 Claims, 20 Drawing Figures

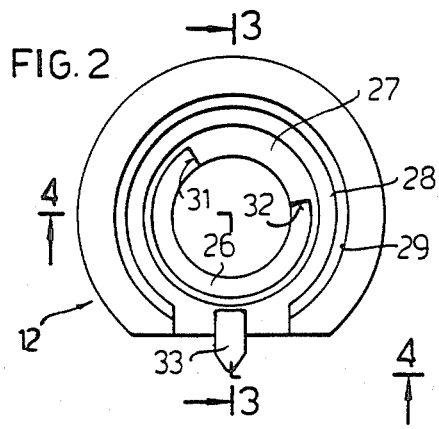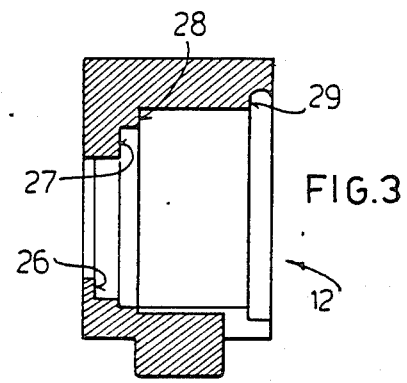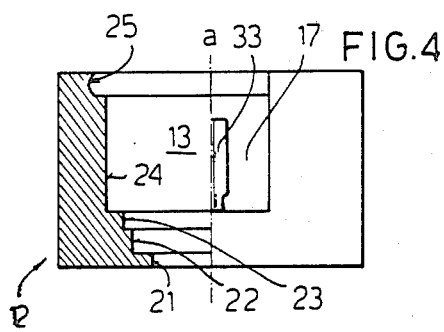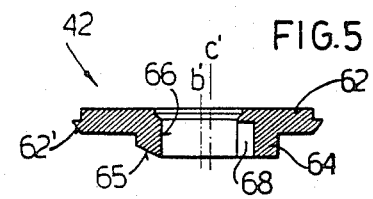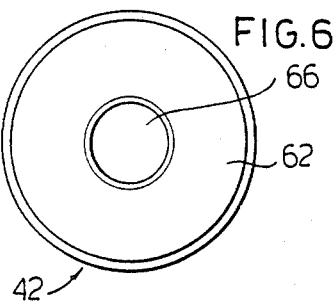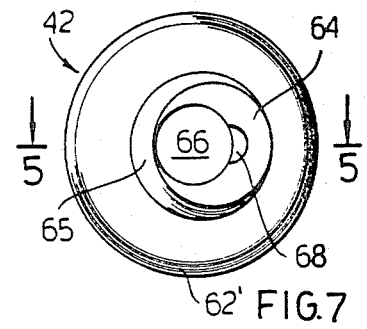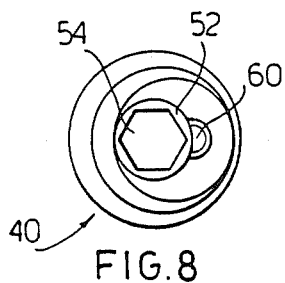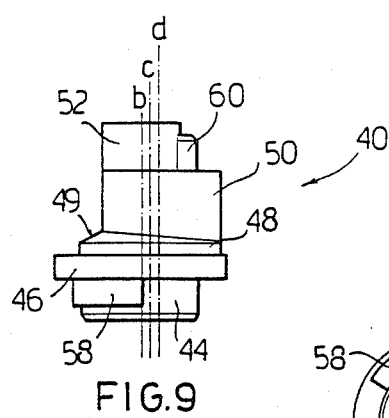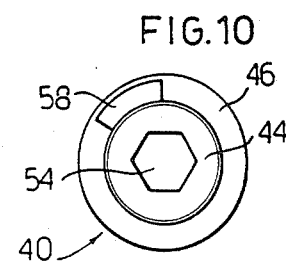

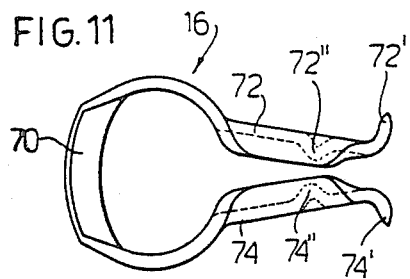
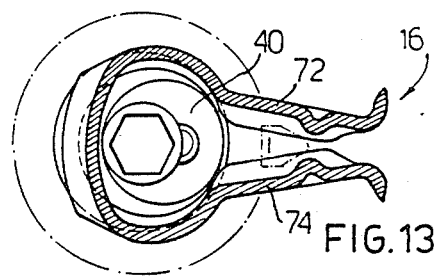
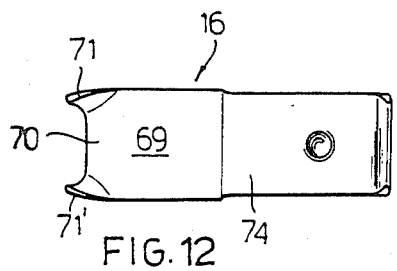
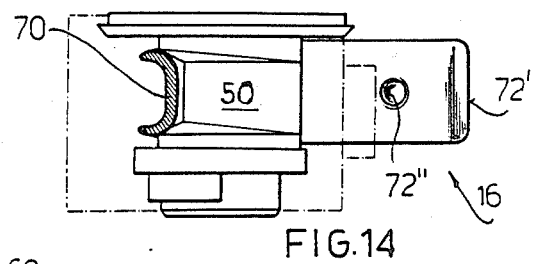
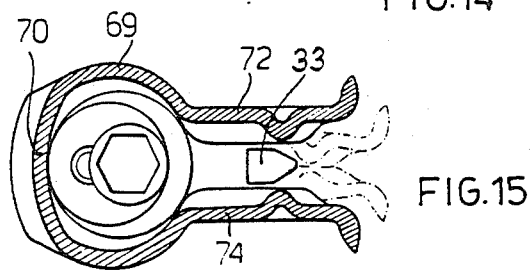
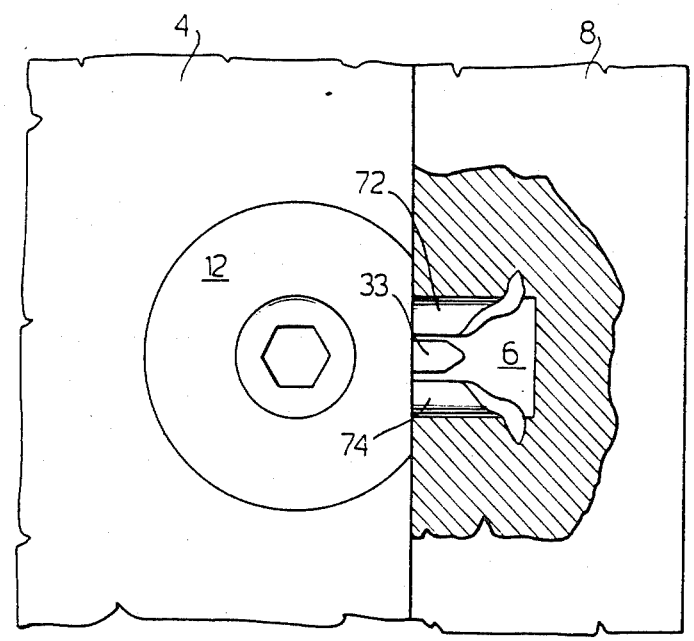

FASTENING DEVICE FOR RELEASABLE INTERCONNECTION OF PANELS

BACKGROUND OF THE INVENTION

This application relates to a fastening device for furnishing panels, particularly furniture panels.

In the art various devices are known (see, for example, Italian applications No. 21246 A/79, 22696 B/77 and 23782 A/77 of the same applicant) for interconnecting or joining a plurality of panels making up a piece of furniture, so that said piece of furniture can be repeatedly disassembled and reassembled. Said prior patents disclose devices which are of increasing safety and easiness in operation, each of which being designed to solve a particular problem. However, said devices have some inconvenient features or complexities in use; for instance, it is inconvenient that said devices are formed of a plurality of separated parts.

DE No. A-2,546,526 teaches a device for joining wooden panels, in which a spreadable leg fastening means is engaged on a fixed wedge and driven therealong for leg spreading. The use of a fixed wedge involves a relative complexity in manufacture; it further involves the necessity of making the wedge and a housing integral therewith of relatively high-quality materials, since not only a protective, but also a resistant function is assigned thereto, whereby the device is comparatively costly. Further, the device shown is not reversible, that is once clamped it cannot be unclamped. Finally, arm spreading or widening out can occur only to the predetermined extent corresponding to the wedge thickness.

FR No. A-2,152,941 shows a fastening device, particularly for sections or structural shapes, in which two hook-like elements are movable between an approached position, in which they do not effect any blocking, and a spread apart position at which they provide for section blocking. A separate spring element presses the hooks to a mutual approached position; a cam element is placed through the hook elements in holes drilled therein, and has a single cam portion which is eccentric with respect to the axis of rotation, this portion pulling said elements back; the spreading of the latter is provided by means of a fixed pin, against which the hook elements will impact when retracted from the cam. A disadvantage of this type of device is the relative complexity due to the number of parts to be assembled and the required accuracy in assembling, the whole involving a relatively high cost of the device. Further, the described device cannot be used for wooden panels, since the arrangement of the parts, providing that the widening out of the arms occurs in the same direction as the axis of rotation, is such as either to prevent the device handling or to split the panel in which the hook arms are engaged.

DE No. A-2,623,814 also teaches a fastening device for sections or structural shapes, comprising two arms which can be spread out by means of a cam. A wedge means is integral with the cam. Also in this case, the cam has an axis parallel to the direction in which such arms spread out and the device cannot be used on wooden panels; further, the assembling thereof is particularly complicated.

EP No. A-0,070,362 also teaches a connection means for section bars in which, as in the above cited publications, a cam cooperates with inclined plane surfaces to displace a fastening member between free and blocked position. Also in this case, for the above reasons set forth in connection with FR No. A-2,152,941 the connection device cannot be used for wooden panels, and further the requirement of prearranging a plurality of inclined planes in a relatively accurate array within the box of the device makes the latter quite costly to manufacture.

SUMMARY OF THE INVENTION

It is an object of this application to provide a furniture connection device of spreadable arm type for use with wooden panels and of relatively simple assembling and accordingly of reduced cost.

It is a further object to provide an improved furniture connection device which is reversible, resistant to transverse stresses, comprises a reduced number of components and has excellent performances.

The foregoing has been achieved by a novel fastening device for releasable interconnection of two elements, in one of which said device is housed and in the other of which an engagement hole is drilled. The novel device comprises a box-like element or housing; a body rotatably through at least an arc in said housing; a resilient element or spring between said housing and said body; said resilient element having a connecting portion for arrangement around said body, and arms extended therefrom and out of the housing. The resilient element can have a disengagement condition at which the arms are moved near one another and extended, and an engagement condition at which the arms are widened out to one another and retracted to engage the walls of said engagement hole; said body having cam means for forcing said arms from said disengagement condition to said engagement condition, when said body rotates. The cam means comprise a double cam formed of lengths of cylindrical surfaces with axes parallel to one another, arranged axially spaced apart from one another on said body. The resilient element has a curved longitudinal edge shape, so that the edges thereof cooperate with a cam, while the area between the edges cooperates with the other cam. Arm spreading out occurs in a direction orthogonal to the axis of rotation of the cam.

The novel device is a single unit without any need of auxiliary parts; it comprises a reduced number of parts; it is readily assembled; it enables a firm but reversible fastening of a second panel to said first panel, with good resistance to transverse stresses. The double cam operation allows controllable arm spreading out and clamping depending on the density of the material for the panel to be connected; arm spreading, if required, beyond the diameter of the hole in the panel, and arm retraction, cause a preload in the panel wood which improves the connection strength even after a long period of time.

BRIEF DESCRIPTION OF THE DRAWINGS

By way of unrestrictive example, an embodiment of the invention will now be described, with reference to the accompanying drawings, in which:

FIG. 2 is a top view of a box-like or housing portion of the device;

FIG. 3 is a sectional view along line 3—3 of FIG. 2;

FIG. 4 is a part sectional view along line 4—4 of FIG. 2;

FIG. 5 is a vertical sectional view along line 5—5 of FIG. 7 for the cover portion of the rotating body;

FIG. 6 is a top view of FIG. 5;

FIG. 7 is a bottom view of FIG. 5;

FIG. 8 is a top plan view of the base portion of the body;

FIG. 9 is a side elevational view of the same;

FIG. 10 is a bottom view of the body base shown in FIGS. 8 and 9;

FIG. 11 is a plan view of a resilient means or spring;

FIG. 12 is a side view of the resilient means;

FIG. 13 is a horizontal sectional view through a spring located on the body base portion when in a disengagement condition; the cover contour is drawn in dash lines;

FIG. 14 is a side view of the spring on the body at the condition shown in FIG. 13; the spring is shown in a sectional view taken on a vertical plane;

FIG. 15 is a view similar to FIG. 13; the elements are shown at engagement condition; the ends of the spring arms are shown by dash and dot lines at disengagement condition;

FIG. 16 shows the device mounted on panels when in a clamping condition thereof; the second panel is shown in sectional view for a clear illustration of the spring;

DESCRIPTION OF THE PREFERRED EMBODIMENTS

Figure 1:
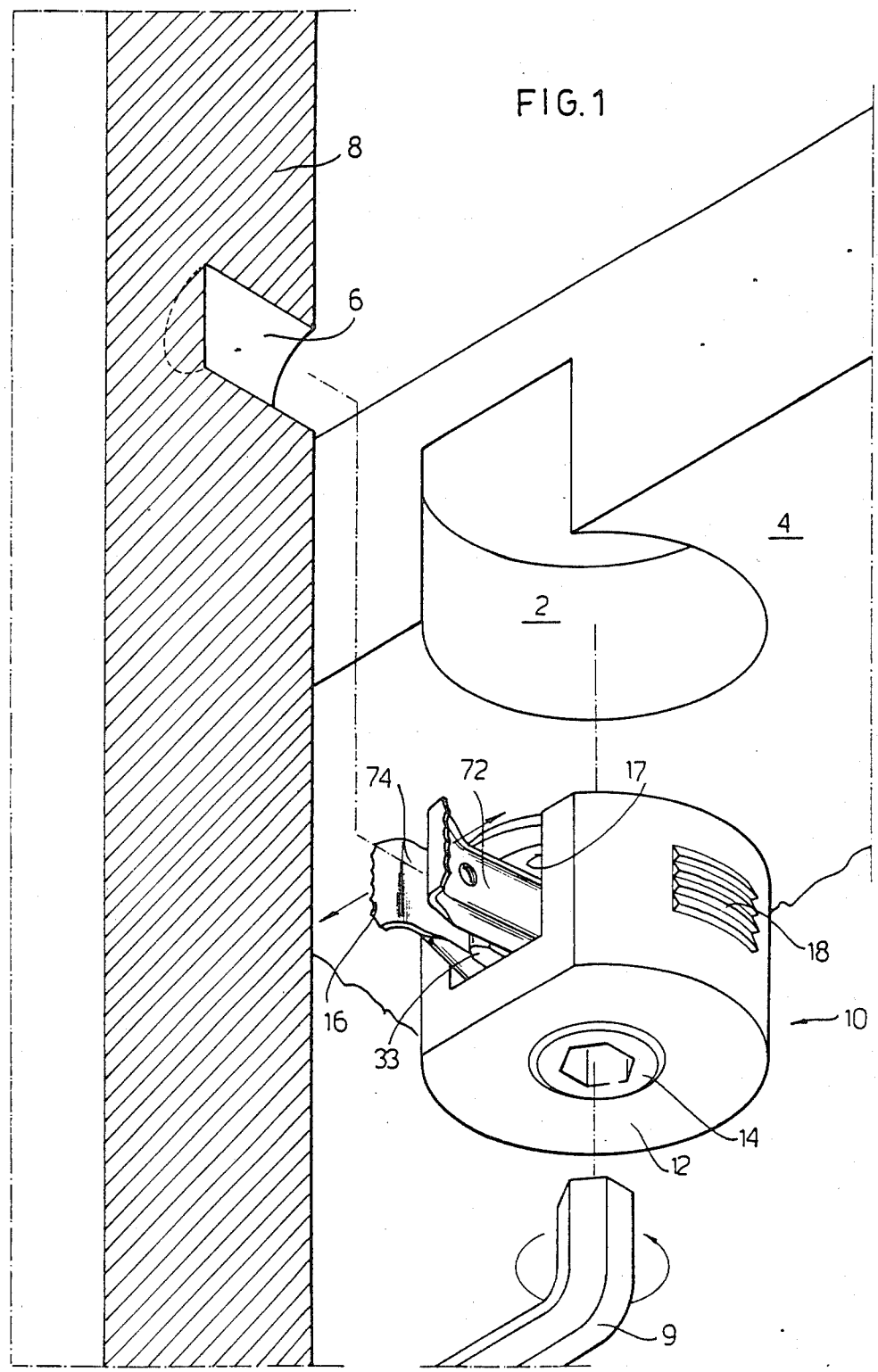
FIG. 1 is an exploded isometric view showing an assembled device, a first panel for receiving the device; a second panel to be fastened to the first panel and shown in sectional view.
Figure 17:
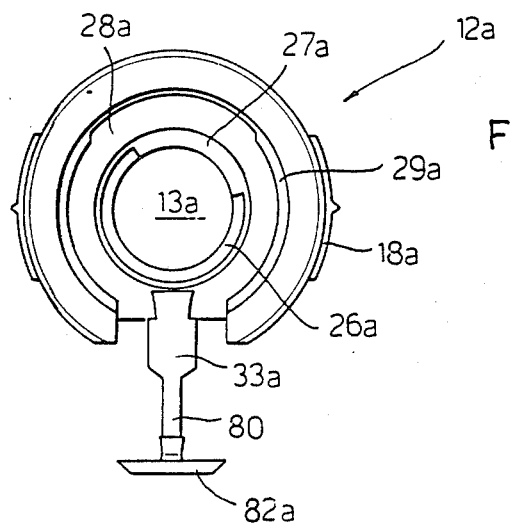
FIG. 17 is a plan view of a presently preferred modified embodiment of the housing element.
Figure 18:
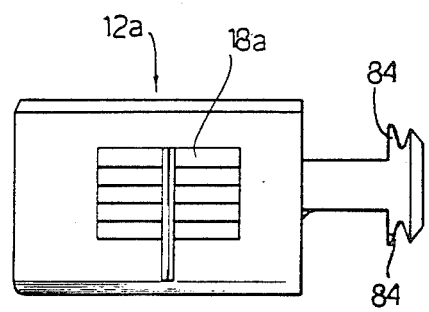
FIG. 18 is a side view of the element of FIG. 17 as seen from the left in said figure.
Figure 19:
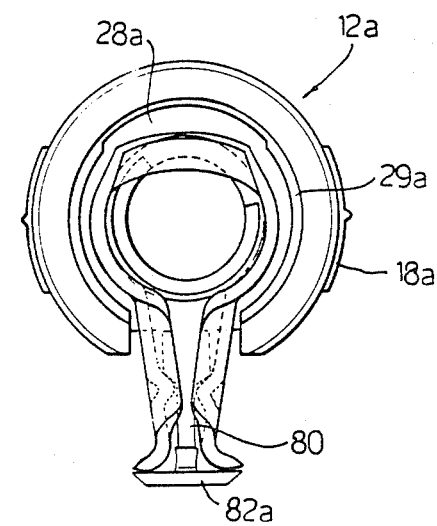
FIG. 19 is a plan view of the housing element of FIG. 17 with a spring element in place.
Figure 20:
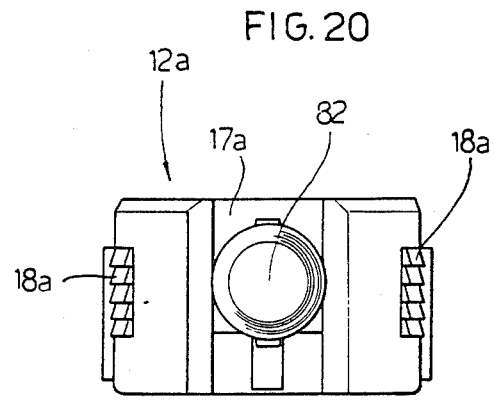
FIG. 20 is a front view of the housing element of FIG. 17.

It should be pointed out in the foregoing and hereinafter that reference is made to vertical, horizontal, upper, lower position and so on; such positions are to be intended to the device as arranged in FIG. 1 and not in a limiting sense.

A novel fastening device 10 substantially comprises a box-like or housing element 12, a body element 14, and a resilient engagement element or spring 16.

The device is suitable to be substantially fixedly housed in a seat 2 in a first or receiving panel 4, and remains exposed on a surface thereof, for example on the lower surface as shown; the engagement element 16 projects to engage a hole 6 in a panel to be fastened or second panel 8, frontwise or sidewise arranged, which hole 6 may be provided, or not, with an engagement bush or sleeve. Reference numeral 9 denotes a wrench for the device operation.

The housing element 12 of the device (FIGS. 2, 3 and 4) has a generally cylindrical contour which in plan view is circular about an axis a, with a cutoff portion defined by a plane parallel to the cylinder axis. The cutoff portion defines an aperture 17 intended (FIG. 1) to be arranged on the edge of panel 4. Generally, at least on part of the outer surface of element 12 saw tooth ribs 18 are provided, as usual, to assist in firmly retaining the housing element within the seat 2 of the panel.

The housing element is internally formed with a through axial cavity or hollow 13, defined by cylindrical surfaces of different diameters (FIG. 4), in the following referred to as first surface 21, second surface 22, third surface 23, fourth surface 24; a fifth surface 25 is preferably an undercut surface. Shoulders (FIG. 3) substantially orthogonal to the axis a are defined between the surfaces and hereinafter referred to as first shoulder 26, second shoulder 27, third shoulder 28 and fourth shoulder 29. The first shoulder 26 extends on part of the circumference and is limited by vertical limit walls 31 and 32 (FIG. 2). The second shoulder 27 extends throughout the circumference, such as shoulders 28 and 29.

At intermediate position, preferably but not necessarily, a shim or wedge projection 33 is formed in the aperture 17, substantially extending according to a radial plane of the housing cylinder and preferably having a shape as shown in FIGS. 2 and 4, that is tapered at the farthermost portion from said axis a and thinned at the base, where it is joined to the remainder of housing 12.

The whole housing 12 may be made of plastics, such as nylon, polycarbonates, acetal resins, or metals.

The body element 14 will now be described with reference to FIGS. 5 to 10. Preferably, the body element comprises two parts, that is a base part 40 (FIGS. 8 to 10) and a cover part 42 (FIGS. 5 to 7), generally made of metal material. The base part 40 comprises a first shaft-like length of cylindrical shape 44, a cylindrical flange-like length 46, a first length 48 of a first cylindrical cam surface; a second cylindrical cam surface 50, and a second cylindrical length 52. The lengths 44, 46, 52 are coaxial about the axis b; the length 48 has an axis c parallel to b, coplanar with and spaced apart therefrom; the cam 50 has an axis d parallel to and spaced apart from axis b and c and coplanar therewith; the axis b and c could also be coincident. Preferably, the cams 48 and 50 have a common generatrix, and the lengths 50 and 52 as well. A surface 49 is inclined to match the profile of the resilient element 16 (FIG. 14), as it will be explained in the following, in order to strengthen the cam lengths 48 and 64. A through hole 54 according to axis b is an engagement for an actuation wrench (for example 9 in FIG. 1). Between the lengths 44 and 46 a ridge 58 is provided in the form of an annulus portion. A projection 60 adjacent the cylindrical length 52 is for engagement of the cover portion 42.

The cover portion 42 comprises a disc section 62 of circular shape about the axis b' and provided with an engagement ridge 62', and a second length 64 of the first cam surface, which is cylindrical about the axis c', offset with respect to axis b', as well as a through hole 66 substantially of the same diameter as that of the length 52 of base 40, and a seat 68 to receive the projection 60. If the axis b and c coincide, the axis b' and c' will coincide as well. The lower surface of the second length 64 is tapered at 65 on part of the circumference. The cover 42 is mounted on the base 40 by slipping the opening 66 and seat 68 on the length 52 and projection 60, respectively, with the axis b and b' coincident and the axis c and c' coincident, to provide a body having the first cam surface 48, 64 and the second cam surface 50 between the flange 46 and disc 62. Of course, any other fitting solution between the base and cover and any other division of the body in two or more parts is possible.

The body is made divided into two parts for mounting the resilient element 16, which will now be described.

Generally, the resilient means, shown at disengagement condition in FIGS. 12 and 13, is made from bent spring steel band; it has a substantially U-shape as seen in plan view and comprises a connection portion 69 with a back 70 and two arms 72, 74 extended from the portion 69. In plan view, the latter (FIG. 11) has a curved shape, resembling an incomplete ellipse or a C, in which a sufficient space is defined for receiving said cam 50. In a side view, said connection portion 69 of the resilient element has the back 70 having an upper edge 71 and a lower edge 71' outwardly curved. This particular shape gives rigidity to the back 70. Each arm 72, 74 has the upper and lower edges inwardly turned and the ends 72', 74' outwardly facing and preferably cut out to provide tips or cutting edges (FIG. 1) to bite and engage the wall of a hole, such as hole 6 in FIG. 1. At the facing surfaces, said arms 72, 74 have a ridge 72", 74", respectively. The resilient element 16 is mounted on the base 40 of body 14 (FIG. 13). The body is then closed by the cover 42. The body 14 and the resilient element 16 assembly is shown in FIG. 13 at disengagement condition (free panels) and in FIG. 15 at engagement condition (panels clamped to one another). At the disengagement condition, the body axis d is arranged between the axis b and the arms; that is, the cam 50 is arranged towards the arms. The edges 71, 71' of the resilient element bear against the inclined surfaces 49 and 65. The resilient element 16 is not biased and retains the arms 72, 74 at mutual approached position. In plan view, the outer surface of the arms is outwardly tapered to the ends 72', 74'.

The assembly comprising said body 14 and resilient element 16 is accommodated within the housing element 12. The cylindrical length 44 enters the hole defined by the surface 21, with the lower surface of ridge 58 bearing against the shoulder 26; the flange length 46 bears against the shoulder 27 and the cavity portion defined by the surface 24 accommodates the resilient element 16. The disc portion 62 is snap engaged within the cavity defined by the surface 25. The shim 33 is inserted between the arms 72, 74 of the resilient element, which however are longitudinally slidable relative thereto. The device is thus assembled to form a unitary body, without separate parts as shown in FIG. 1, and is ready for application to a panel. The body 14 can rotate with respect to the box through an arc of circle as set by the engagement of ridge 58 on the arcuate shoulder 26 between the end or limit walls 31 and 32.

When rotating, said body 14 within the housing 12 (for any angle of rotation, e.g. 180° from the position shown in FIG. 13 to that shown in FIG. 15), the back 70 of the resilient element 16 is moved (retracted) by a distance and two opposite actions are generated on the resilient element. The cam 50 exerts a pushing action on the back 70 and the cam surfaces 48 and 46 exert a pushing action against the surfaces of the element 16 opposite thereto, that is against surfaces at the positions 72a and 74a at the roots of arms 72, 74. This dual action tends to move said back and arm away from one another. Also due to the greater rigidity of said back, as a whole there is provided a spreading apart and retraction of the arms, as shown in FIG. 15, where the biased or engaged position of the device is shown by full line and the unbiased or disengaged position is shown by dash and dot line (it should be noted that shim 33 is not acted on for arm spreading out). When the device is operating on panels, the arm spreading out causes the arm ends to be driven into the walls of the panel hole 6 and the simultaneous retraction causes the panels to be clamped to one another. At the engagement position of the device, the box shim or wedge 33 remains positioned between the arm ridges 72", 74" of the arms generally not in contact therewith, and serves to nullify any possible yieldings of the spring as time passes; in case of use of steels having high mechanical characteristics, said shim could be dispensed with. At said engagement position the arms have the outer surfaces thereof in substantially cylindrical arrangement and are tamped in the hole to impart a good strength to transverse stresses.

In order to release the device, the body 14 has only to be rotated through the same angle, e.g. 180° in opposite direction. By varying the cam diameters, the characteristics may be varied both in expansion and traction to accommodate the various densities of the materials to be connected.

FIGS. 17 to 20 show a presently preferred embodiment of the housing element of the device. The housing element is denoted by reference numeral 12a and the parts thereof corresponding to those of said element 12 are denoted by the same reference numerals followed by letter a and are not further described. Therefore, the housing element 12a comprises an aperture 17a, saw tooth ribs 18a, an inner cavity 13a with cylindrical surfaces of different diameters, and shoulders 26a, 27a, 28a, 29a.

A shim-like projection 33a extends from a stem 80 carrying at the end a small disc or plug 82 with chamfered wall. The length of said stem is such that, at released condition of the device, the ends 72', 74' of the spring arms are at least just behind said disc 82. The diameter of the latter is such as to substantially cover the cross extension area of said ends 72', 74'. Said disc 82 performs the function of aiding the insertion of the spring arms of the device in a panel hole. Pins 84 may be provided on said stem 80, such pins projecting from the stem and being slightly elastic, the function of which is to hold the stem slightly engaged in the hole of a panel to be assembled. Of course, said plug or disc 82 could be otherwise assembled to the device.

What we claim is:

1. A fastening device for releasable interconnection of two elements, in one of which said device is accommodated and in the other of which an engagement hole is provided, said device comprising:

a housing element;

a body rotatably mounted in said housing element;

a resilient element located between said housing element and said body;

said resilient element having a back and arms extended therefrom and extending out of the housing element, said resilient element being movable between a disengagement condition, at which said arms are positioned near one another, and an engagement condition, at which said arms are spread apart from one another to engage the walls of said engagement hole, said body defining cooperating cam means to urge said arms from said disengagement condition to said engagement condition, said cam means including a first cam surface and a second cam surface which is eccentric with respect to an axis of rotation of the body and the first cam surface, and when said body is rotated to said engagement condition said first cam surface acts on said arms and said second cam surface acts on said back.

2. A device as claimed in claim 1, wherein said first cam surface and said second cam surface are staggered along the rotation axis of the body.

3. A device as claimed in claim 1, wherein said first and said second cam surfaces are cylindrical and have a common generatrix, the first cam surface is made of two lengths axially defining the second cam surface; said lengths have inclined connecting surfaces between the cylindrical surfaces of the first and second cam surface.

4. A device as claimed in claim 1, wherein said resilient element comprises a connection portion for positioning around said body and arms extended from said portion, each arm having an outwardly bent end which is shaped to bite the hole walls.

5. A device as claimed in claim 4, wherein each arm has inwardly bent longitudinal edges and said connection portion has a relatively rigid back.

6. A device as claimed in claim 5, wherein said back has outwardly bent edges.

7. A device as claimed in claim 1, wherein said body is made of two interengageable parts, that is a base part and a cover part.

8. A device as claimed in claim 7, wherein said base part comprises a first cylindrical shaft-like length and a second cylindrical flange-like length, which are coaxial about the axis of rotation of said body, a first length of said first cam surface, and said second cam surface; and said cover comprises a second length of said first cam surface and a disc end portion.

9. A device as claimed in claim 1, wherein said housing element has a cylindrical shape with a portion removed according to a plane parallel to the axis to form an aperture; and has an axial cavity having a plurality of shoulders orthogonal to the axis for supporting the body.

10. A device as claimed in claim 9, wherein said housing element has a projecting portion extended in said aperture, said projecting portion being arranged between said arms.

11. A device as claimed in claim 4, further comprising a plug means externally arranged against the arm ends.

12. A device as claimed in claim 11, wherein said plug means are integral with a stem, which is integral with said housing element.

13. A device as claimed in claim 11, wherein said stem has projecting engagement means.

* * * * *